(12) United States Patent
Chan et al.

(10) Patent No.: US 8,548,510 B2
(45) Date of Patent: Oct. 1, 2013

(54) METHOD AND APPARATUS FOR RECEIVING MESSAGES UNDER FIRST AND SECOND NETWORK COVERAGE

(75) Inventors: Kwong Hang Kevin Chan, Kanata (CA); Shiva Mirzaei-Rezaei, Kanata (CA); Jose Antonio Gomez Velez, Ottawa (CA); Cecilia Moncaleano, Ottawa (CA); Thomas Leonard Trevor Plestid, Ottawa (CA)

(73) Assignee: Blackberry Limited, Waterloo, Ontario (CA)

( * ) Notice: Subject to any disclaimer, the term of this patent is extended or adjusted under 35 U.S.C. 154(b) by 0 days.

(21) Appl. No.: 13/339,485

(22) Filed: Dec. 29, 2011

(65) Prior Publication Data
US 2013/0172023 A1 Jul. 4, 2013

(51) Int. Cl.
*H04M 1/00* (2006.01)
(52) U.S. Cl.
USPC ......... 455/466; 455/552.1; 370/331; 370/345
(58) Field of Classification Search
USPC .......... 455/404.1, 412.1–412.2, 414.1–414.2, 455/422.1, 432.1–444, 447, 448, 450–452.2, 455/466, 550.1, 552.1, 553.1; 370/312, 319–326, 331–350
See application file for complete search history.

(56) References Cited

U.S. PATENT DOCUMENTS

| | | | |
|---|---|---|---|
| 6,738,373 B2 | 5/2004 | Turner | |
| 7,953,424 B2 | 5/2011 | Turner et al. | |
| 8,054,772 B1 * | 11/2011 | Upadhyay et al. | ............ 370/312 |
| 8,060,133 B1 | 11/2011 | Khanka et al. | |
| 2007/0072643 A1 | 3/2007 | Jiang et al. | |
| 2007/0097922 A1 * | 5/2007 | Parekh et al. | ................. 370/332 |
| 2009/0005042 A1 | 1/2009 | Bi | |
| 2010/0124898 A1 * | 5/2010 | Qu et al. | .................... 455/404.1 |
| 2010/0265913 A1 | 10/2010 | Gorokhov et al. | |
| 2011/0199950 A1 | 8/2011 | Klingenbrunn et al. | |
| 2012/0282975 A1 * | 11/2012 | Mujtaba et al. | ............ 455/552.1 |

FOREIGN PATENT DOCUMENTS

EP 1 113 690 A2 7/2001

OTHER PUBLICATIONS

CDMA Development Group, CDMA Device Requirements—CDMA2000 1xEV-DO Revision A, CDG Document 148, Version 1.0, Aug. 16, 2007, 36 pages.
Telecommunications Industry Association, Upper Layer (Layer 3) Signalling Standard for cdma2000 Spread Spectrum Systems: Addendum 1, TIA/EIA Interim Standard TIA/EIA/IS-2000.5-A-1, Nov. 2000, 1730 pages.
TIA, "Commercial Mobile Alert Service (CMAS) Over CDMA Systems", Jul. 2009, pp. 1-44, http://specs4.ihserc.com.
Turner S. et al., "cdma2000 Hybrid Access Terminal Operation", Annoucement Qualcomm CDMA Technologies, Apr. 9, 2001, pp. 1-25.
European Search Report for corresponding European Patent Application No. 11196007.6, Apr. 18, 2012, 9 pages.

* cited by examiner

*Primary Examiner* — Kashif Siddiqui

(57) ABSTRACT

A method and apparatus are provided wherein a mobile device operates some of the time on a first network and some of the time on a second network, and wherein while handling traffic of a defined type over the first network, the mobile device selectively tunes away to the second network to see if there are any messages. The method and apparatus allow a mobile device with a single transceiver to receive CMAS alerts transmitted over a 1xRTT network while minimizing disruption to ongoing delay sensitive data applications operating on a 1xEV-DO network.

28 Claims, 7 Drawing Sheets

METHOD AND APPARATUS FOR RECEIVING MESSAGES UNDER FIRST AND SECOND NETWORK COVERAGE

FIELD

The present disclosure relates generally to mobile devices, and more particularly, to mobile devices operating some of the time on a first network and some of the time on a second network.

BACKGROUND

Wireless carriers may operate different types of communication networks. Some such networks may be optimized for voice services, while others may be optimized for providing data services.

Presently, $3^{rd}$ Generation Partnership Project 2 (3GPP2) carriers (also known as CDMA2000 carriers) often operate a pair of networks. The first such network, referred to herein as 1xRTT, operates in accordance with the CDMA2000 1x standard (also known as International Standard 2000 (IS-2000)), and is optimized for voice services, Short Message Service (SMS) text messaging, and related services. The second such network, referred to herein as 1xEV, operates in accordance with the CDMA2000 1xEV-DO standard (also known as International Standard 856 (IS-856)), and is optimized for packet-oriented data services.

Some communications networks provide broadcast messaging services to facilitate transmitting a message to several mobile devices. One such service, the Commercial Mobile Alert Service (CMAS), also known as the Personal Localized Alerting Network (PLAN), enables the transmission of emergency alerts to CMAS-enabled mobile devices located in a geographically targeted area. In the United States, support for receiving CMAS alerts will, starting in early 2012, become a Federal Communications Commission (FCC) mandate for carrier networks and mobile devices. For mobile devices, the FCC mandate will require: that a mobile device cannot opt out of receiving alerts designated as being Presidential alerts, and that upon receiving a CMAS alert, a mobile device should play a tone and vibrate. For now at least, there is no FCC requirement for mobile devices regarding CMAS delivery success rates or latency.

CMAS alerts are expected to be sent only in case of emergency. Accordingly, there is no expectation that a carrier network will send CMAS messages at a certain time of the day. CMAS messages could be sent to mobile devices at any time. When CMAS messages are sent, timely delivery may be important to the user.

For 3GGP2 carriers (e.g. Verizon™ and Sprint™), CMAS alerts will be delivered as a broadcast SMS over a 1xRTT forward common channel, typically following a cycle defined by a broadcast index. When CMAS is enabled in a specific coverage area, a mobile station in that area will periodically tune to 1xRTT, typically at a time slot defined by the broadcast index (the broadcast slot), to receive the broadcast SMS.

BRIEF DESCRIPTION OF THE DRAWINGS

Examples of embodiments will now be described in greater detail with reference to the accompanying drawings, in which.

DETAILED DESCRIPTION

In one aspect, there is provided a method in a mobile device, the method comprising: while not handling traffic of a defined type over a first network, from time to time checking a second network to see if there are any messages; while handling traffic of the defined type over the first network, from time to time tuning away to the second network to see if there are any messages, the tuning away while handling traffic of the defined type over the first network taking place less frequently than the checking the second network while not handling traffic of the defined type over the first network.

In another aspect, there is provided a mobile device comprising at least one antenna; a transceiver using the at least one antenna; a controller configured to control the transceiver to: while not handling traffic of a defined type over a first network, from time to time check a second network to see if there are any messages; while handling traffic of the defined type over the first network, from time to time tune away to the second network to see if there are any messages, the tuning away while handling traffic of the defined type over the first network taking place less frequently than the checking the second network while not handling traffic of the defined type over the first network.

In still another aspect, there is provided a tangible computer readable medium having recorded thereon instructions for execution by a mobile device, said instructions when executed causing the mobile device to execute a method comprising: while not handling traffic of a defined type over a first network, from time to time checking a second network to see if there are any messages; while handling traffic of the defined type over the first network, from time to time tuning away to the second network to see if there are any messages, the tuning away while handling traffic of the defined type over the first network taking place less frequently than the checking the second network while not handling traffic of the defined type over the first network.

More generally, in some aspects there is provided a tangible computer readable medium having recorded thereon instructions for execution by a mobile device, said instructions when executed causing the mobile device to execute any of the methods described herein.

Figure 1:
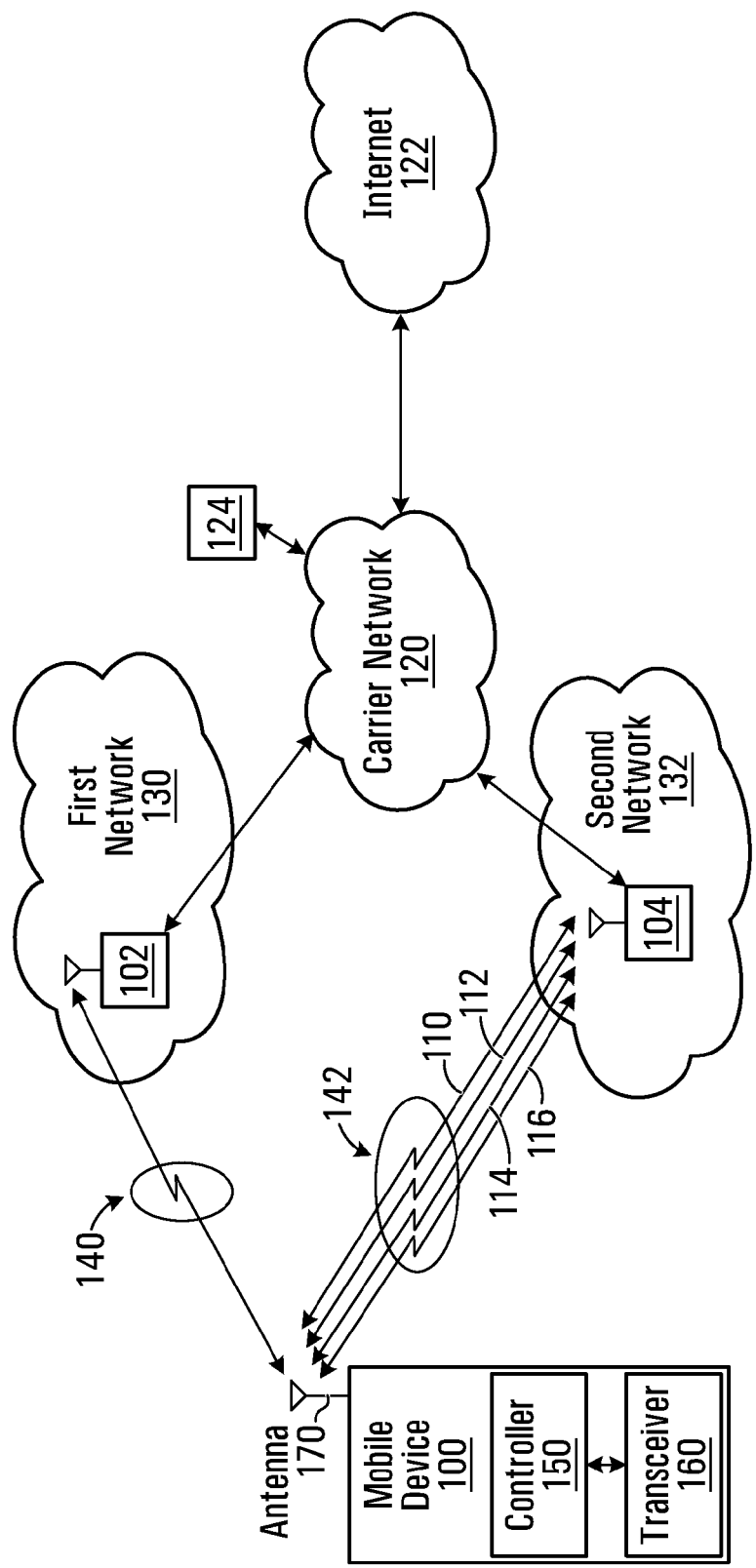
FIG. 1 is a block diagram of an example dual-network environment.

FIG. 1 is a block diagram of an example dual-network environment. A first network 130 includes base station 102. A second network 132 includes base station 104. Base stations 102 and 104 are coupled to or form part of a carrier network 120, which may be coupled to a plurality of other networks, such as the Internet 122. Carrier network 120 is also coupled (directly or indirectly, for example via one or more other networks, potentially including the Internet 122) to a message source 124 supplying a mobile carrier operating carrier network 120 with messages. Mobile device 100 has an antenna 170, a transceiver 160 using the antenna 170, and a controller 150 configured to control the transceiver 160. More generally, there may be multiple transceivers, multiple antennas, or a combination of multiple transceivers and multiple antennas. As depicted, the mobile device 100 communicates with base station 102 of first network 130 over an air interface 140, and some of the time, the mobile device 100 communicates with base station 104 of second network 132 over an air interface 142. Air interface 142 may include a pilot channel 110 transmitted by base station 104, a paging channel or forward common channel 112 transmitted by base station 104, a forward-link traffic channel 114 transmitted by base station 104, and a reverse-link traffic channel 116 transmitted by the mobile device 100.

In some of the embodiments described below, the first network 130 is a network providing data services, and the second network 132 is a network providing voice services. In some of the embodiments described below, the first network 130 is a 1xEV compatible network and the second network 132 is a 1xRTT compatible network. More generally, the first network 130 and second network 132 may comprise other combinations of networks, including networks operating according to Global System for Mobile (GSM)/Enhanced Data rates for GSM Evolution (EDGE), Universal Mobile Telecommunications System (UMTS)/High Speed Packet Access (HSPA), and Long Term Evolution (LTE) standards.

In some of the embodiments described below, message source 124 is a CMAS data source supplying a mobile carrier operating carrier network 120 with emergency alert information, but more generally, message source 124 may supply other message types, such as voicemail notifications, incoming call notifications, and SMS messages. Message source 124 may be part of carrier network 120.

The transceiver 160 of mobile device 100 uses the antenna 170 and is configurable to operate on first network 130 or to operate on second network 132. Controller 150 is configured to control the transceiver 160 to, while not handling traffic of a defined type over the first network 130, from time to time check the second network 132 to see if there are any messages; and while handling traffic of the defined type over the first network 130, from time to time tune away to the second network 132 to see if there are any messages, the tuning away while handling traffic of the defined type over the first network 130 taking place less frequently than the checking the second network 132 while not handling traffic of the defined type over the first network 130. In so doing, the tune aways performed while handling traffic of the defined type will be less likely to disrupt that traffic.

In some of the embodiments described below, the traffic of the defined type comprises delay sensitive traffic, such as traffic from delay sensitive applications such as Push-to-Talk (PTT), video streaming, Voice-Over-IP (VOIP), and Skype™ or otherwise high priority traffic, but more generally, the defined type may include other traffic types.

In some of the embodiments described below, the tuning away to the second network to see if there are any messages while handling traffic of the defined type over the first network comprises tuning away to the second network to see if there are any CMAS messages, but more generally, this may comprise tuning away to the second network to see if there are other types of messages, such as voicemail notifications, incoming call notifications, and SMS messages.

The first network 130 has been described as including a base station 102. Of course, it is to be understood that the first network may include other components, not shown, for the normal operation of such a network. For a voice network, such as a 1xRTT network, these additional components may, for example, include additional base stations, relay stations, repeaters, routers, antennae, wired and wireless links, and control hardware.

The second network 132 has been described as including a base station 104. Of course, it is to be understood that the first network may include other components, not shown, for the normal operation of such a network. For a packet network, such as a 1 xEV network, these additional components may, for example, include additional base stations, relay stations, repeaters, routers, antennae, wired and wireless links, and control hardware.

The networks have been shown interconnected in a specific manner. It is to be understood, that this is for the purpose of example only. In addition, while the mobile device is said to perform certain tune away behaviour in respect of the first network 130 and the second network 132, of course, the actual pair of networks providing service to a mobile device will vary over time due to the mobility of the mobile device. Thus, when the mobile device moves to a different location so as to be provided service by a different pair of networks, the mobile device may still perform the tune away methods described herein, but in respect of that different pair of networks.

In addition, the roles of the "first network" and the "second network" may be reversed.

Similarly, the mobile device 100 is shown with a specific set of components connected in a specific way. The functionality of these components may be implemented in a smaller or larger number of components in other implementations. The mobile device may include other components as well known to those skilled in the art.

Figure 2:
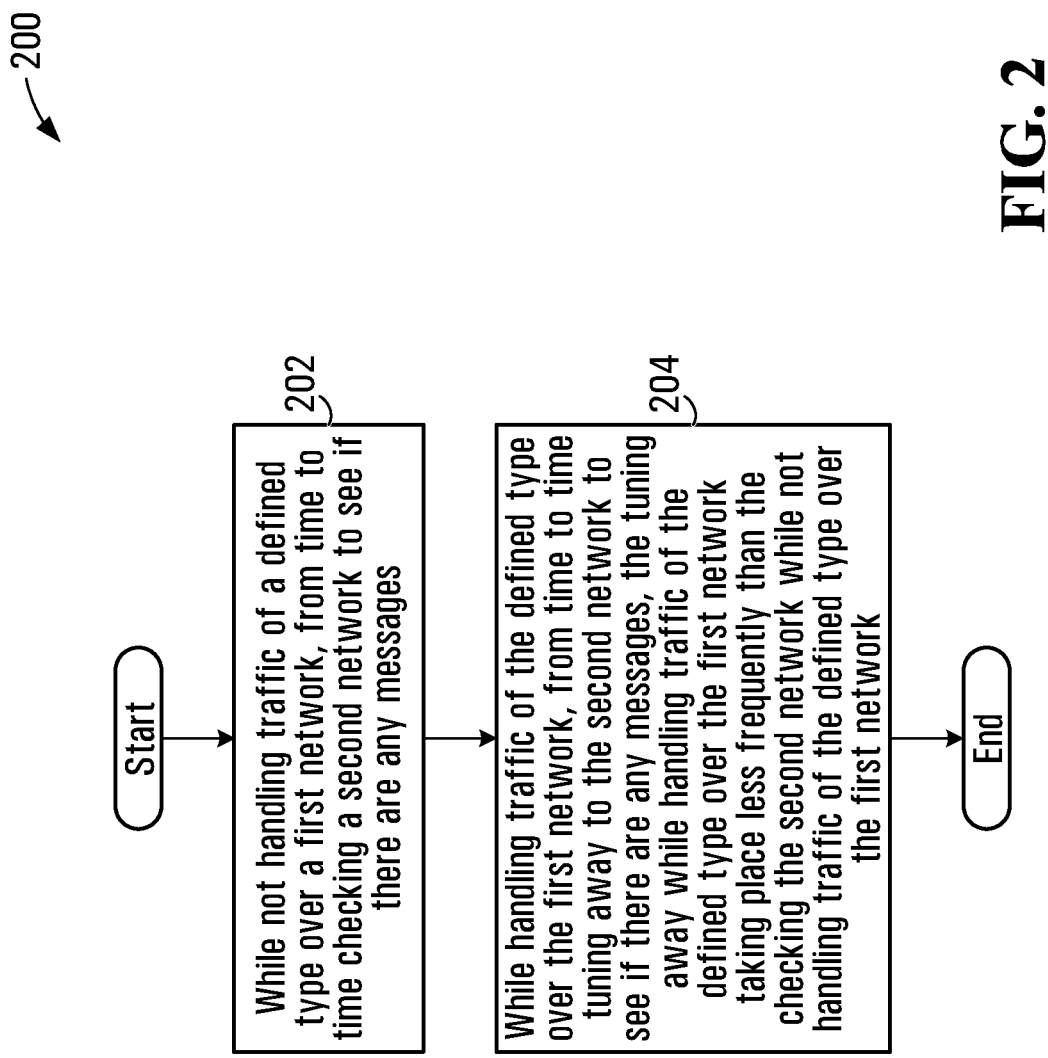
FIG. 2 is a flowchart of a method of tuning away.

FIG. 2 is a flowchart of a method 200 of tuning away for execution by a mobile device. A mobile device such as depicted in FIG. 1 may be used to execute the method, but that is only one specific example.

In the method of FIG. 2, at block 202, while not handling traffic of a defined type over a first network, the mobile device from time to time checks a second network to see if there are any messages. At block 204, while handling traffic of the defined type over the first network, the mobile device from time to time tunes away to the second network to see if there are any messages, the tuning away while handling traffic of the defined type over the first network taking place less frequently than the checking the second network while not handling traffic of the defined type over the first network of block 204.

While FIG. 2 is described and depicted as a flowchart, it should be understood that the functionality described does not need to take place in the specific order described, and some of the elements may overlap in time.

In addition, in block 204 the tune away takes place while handling traffic of the defined type in the sense that communications of the defined type are in progress when the tune away is initiated. For example, there may be a video telephony call in progress. For the period that the tune away takes place the mobile device no longer is operating on the first network, the mobile device no longer continues to handle traffic of the defined type over the first network until it returns to operating on the first network.

Specific Example of Tune Away

Mobile device 100 does not operate simultaneously on the first and second networks. This may be because mobile device 100 has only a single transceiver, or in the event it has multiple transceivers, it is configured temporarily or permanently to only operate on one network at a time. For example, a single transceiver device may not be able to receive 1xEV data during a voice call using the 1xRTT network.

The act of tuning the transceiver so that the mobile device switches from operating on one network to operating on a different network is referred to as tune away. In some cases, tune away may also include the act of tuning the transceiver back to the network to which it had previously been tuned.

Current single transceiver mobile devices operating in accordance with CDMA standards normally tune to 1xRTT on a fixed schedule called a slot cycle. The duration of the slot cycle is determined from a slot cycle index broadcast to mobile devices by the carrier network. Typical slot cycle lengths are 2.56 seconds or 5.12 seconds. The periodic tune away to 1xRTT enables a mobile device to receive notifications of incoming voice calls and SMS messages as well as updated network status information and other system overhead information. The updated network status and overhead information is provided, at least in part, through an Extended System Parameter Message (ESPM) received from the 1xRTT overhead channel during the periodic tune away to 1xRTT.

Figure 3:
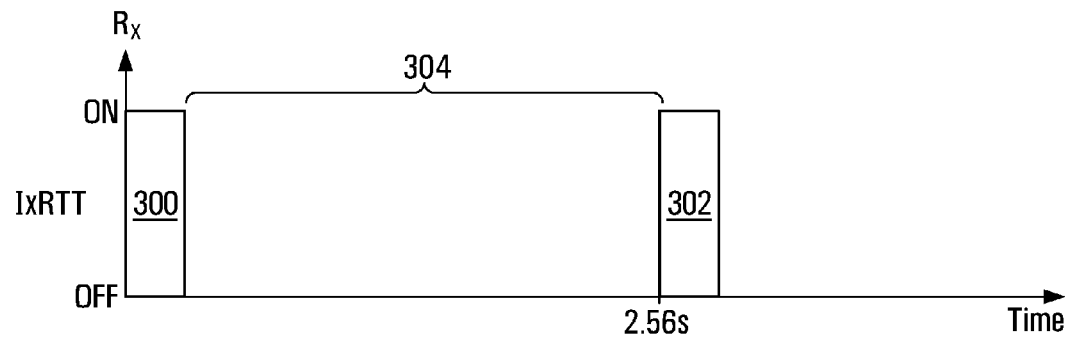
FIG. 3 is an example timeline of 1xRTT tune away.

FIG. 3 is an example timeline of 1xRTT tuning according to a 2.56 second slot cycle. During initial slot 300, a transceiver of a mobile device is tuned to 1xRTT. During a slot 302 beginning 2.56 s after slot 300, the transceiver is also tuned to 1xRTT. During interval 304 between slots 300 and 302, the transceiver is not tuned to 1xRTT.

In the example 1xRTT tuning of FIG. 3, a mobile device tunes its transceiver to 1xRTT during slots 300 and 302 as part of a 2.56 s slot cycle. During interval 304, the mobile device's transceiver may be shut off to conserve power. Alternatively, the mobile device's transceiver may tune to a 1xEV network to receive data during interval 304.

Implementation of CMAS Alerts

CMAS alerts, when supported by a 3GPP2 carrier network, are delivered as a broadcast SMS over a 1xRTT forward common channel, such as a paging channel 112. It is possible for the carrier network to continuously broadcast a CMAS alert on all available slots of the forward common channel. Alternatively, CMAS alerts are broadcast on a fixed cycle (the broadcast cycle) defined by a broadcast index. When CMAS is so enabled in a specific coverage area, mobile device 100 may periodically tune to 1xRTT at a time slot defined by the broadcast index (the broadcast slot). The broadcast cycle may be longer than a typical slot cycle. An example broadcast cycle may be in the neighborhood of 15 seconds. In one example, the specification and test plan for carrier Verizon™ indicate that CMAS messages could be sent at one of the following cycles: 2.8 seconds, 5.36 seconds, 10.48 seconds, 20.72 seconds, 41.2 seconds, 81.92 seconds, or 164.08 seconds.

Figure 4:
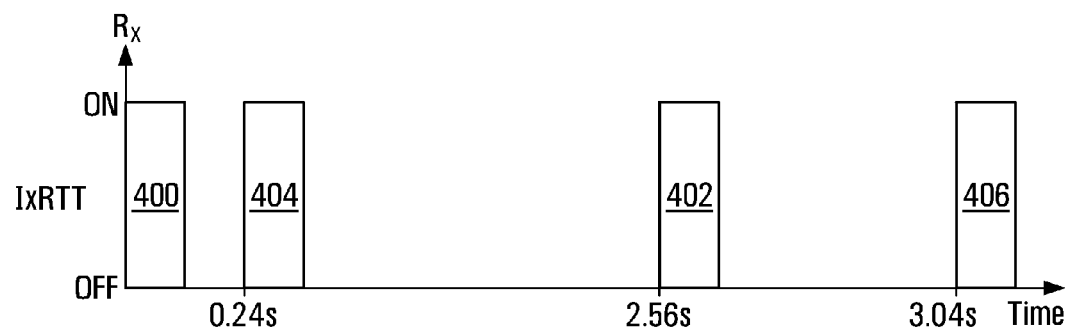
FIG. 4 is an example timeline of 1xRTT tune away with a CMAS tune away cycle superimposed.

FIG. 4 is an example timeline of 1xRTT tuning in which tuning is performed both for a 2.56 s slot cycle and a 2.8 s broadcast cycle. During initial slot 400, a transceiver of a mobile device is tuned to 1xRTT. During a slot 402 beginning 2.56 s after slot 400, the transceiver is also tuned to 1xRTT. In addition, during a slot 404 beginning, in this example, at 0.24 s, the transceiver is tuned to 1xRTT. During a slot 406 beginning 3.04 s after slot 404, the transceiver is also tuned to 1xRTT.

In the example 1xRTT tuning of FIG. 4, a mobile device tunes its transceiver to 1xRTT during slots 400 and 402 as part of a 2.56 second slot cycle. The mobile device also tunes its transceiver to 1xRTT during slots 404 and 406 as part of a 2.8 second broadcast cycle. The broadcast cycle 400, 402 may be understood as being "superimposed" on the slot cycle depicted in FIG. 3.

In a 3GPP2 carrier network, mobile devices that are active in a coverage area may use different scheduled time slots for the broadcast SMS while following the broadcast cycle (except when CMAS alerts are being broadcast on all available slots). This is accomplished by assigning each such mobile device a different offset to the broadcast cycle period. For example, a mobile device may be assigned offset $x_1$ and if a broadcast cycle is 2.8 seconds, broadcast slots for the mobile device would occur at times: 0 s+$x_1$, 2.8 s+$x_1$, etc.

Figure 5:
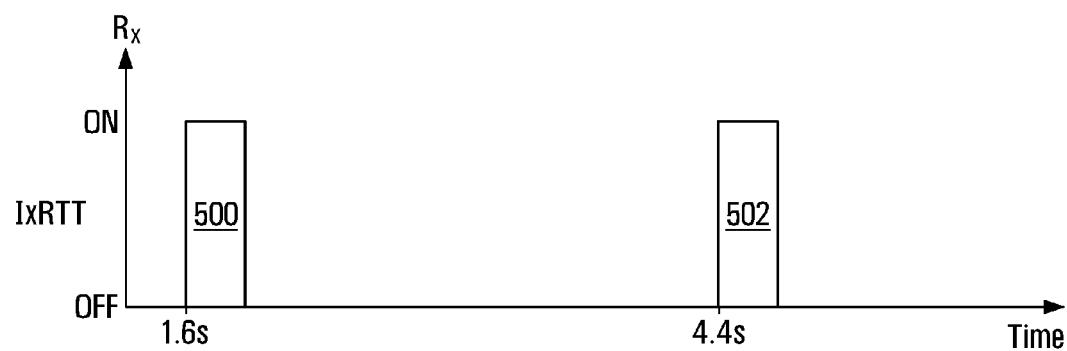
FIG. 5 is an example timeline of 1xRTT tune away with a slot cycle offset for a particular mobile device.

FIG. 5 is an example timeline of 1xRTT tuning according to a 2.8 s broadcast cycle with an example offset of 1.6 seconds. During slot 500, which begins at a 1.6 second offset, a transceiver of a mobile device is tuned to 1xRTT. During a slot 502 beginning 2.8 s after slot 500, the transceiver is also tuned to 1xRTT.

In the example 1xRTT tuning of FIG. 5, a mobile device tunes its transceiver to 1xRTT during slots 500 and 502 as part of a 2.8 s broadcast cycle with an offset of 1.6 s.

In a 3GPP2 carrier network, a mobile device may determine the broadcast index to use from the ESPM most recently received by the mobile device. If the broadcast index contained in the ESPM message is 0, the current cell is indicating that there is no imminent broadcast SMS being sent on the current cell. In this case, the mobile device does not need to tune to 1xRTT on a broadcast cycle. If the broadcast index contained in the ESPM message is nonzero, a broadcast message may be being transmitted during the broadcast cycle.

Duration of 1xRTT Tune Away

In a mobile device with a single transceiver which may monitor 1xRTT and 1xEV networks in a time shared fashion, periodic tune away to 1xRTT may disrupt data transmissions on the 1xEV network, and this may pose a problem for ongoing delay sensitive data applications such as Push-to-Talk (PTT), video streaming, Voice-Over-IP (VoIP), and Skype™ that use the 1xEV network.

Notably, the duration of 1xRTT tune away is not constant and is governed by several factors in some implementations. When a mobile device tunes to 1xRTT, the device may be required to follow mandated behavior. For example, if a mobile device crosses a zone registration boundary, it may be required to send a registration message to the network. Also, if the signal strength of the current pilot deteriorates while the signal strength of a candidate pilot strengthens, a mobile device may be required to perform an idle handoff to the better pilot. If the signal strength of the current pilot deteriorates to a level which is not strong enough to be decoded, the mobile device will lose the system. Upon occurrence of a system lost event, the mobile has to perform a scan of all available channels. All of these actions may have a significant impact on any ongoing delay sensitive applications.

A mobile device may need to decode a 1xRTT overhead channel when tuning away, and this may be another source of variability in the duration of tune aways. When decoding the 1xRTT overhead channel, the mobile device could be successful on the first try if the channel conditions are good, and in such cases, each tune away may result in a stop of 1xEV data reception by about 100 ms. However, in other cases, for example when channel conditions are poor, the stop of 1xEV data reception may also last as long as 5 to 30 seconds. If a mobile device cannot decode the 1xRTT overhead channel from the current base station, the mobile device will scan and try other base stations. In some extreme cases, the mobile device will scan and try other 1xRTT bands and channels. In cases where a tune away to 1xRTT is in progress and has taken an extended amount of time, it may be difficult (not 1xRTT standard compliant) to force the mobile device to go back to 1xEV before the 1xRTT tune away has completed.

In good radio frequency (RF) conditions, the disruption to 1xEV data reception due to 1xRTT tune away is usually 500 ms or less. In mixed or poor coverage areas, tune aways can take anywhere from 1 to 30 seconds, causing a significant disruption to 1xEV data transmission and reception.

In some cases, the disruption to 1xEV data reception may violate quality of service guidelines imposed by carriers. For example, a carrier's delay target for PTT applications may be 3 seconds. Also, although PTT is the delay sensitive data application that is most commonly deployed at present, as VoIP applications like Skype™ become more common, avoiding long tune aways will become more important.

Figure 6:
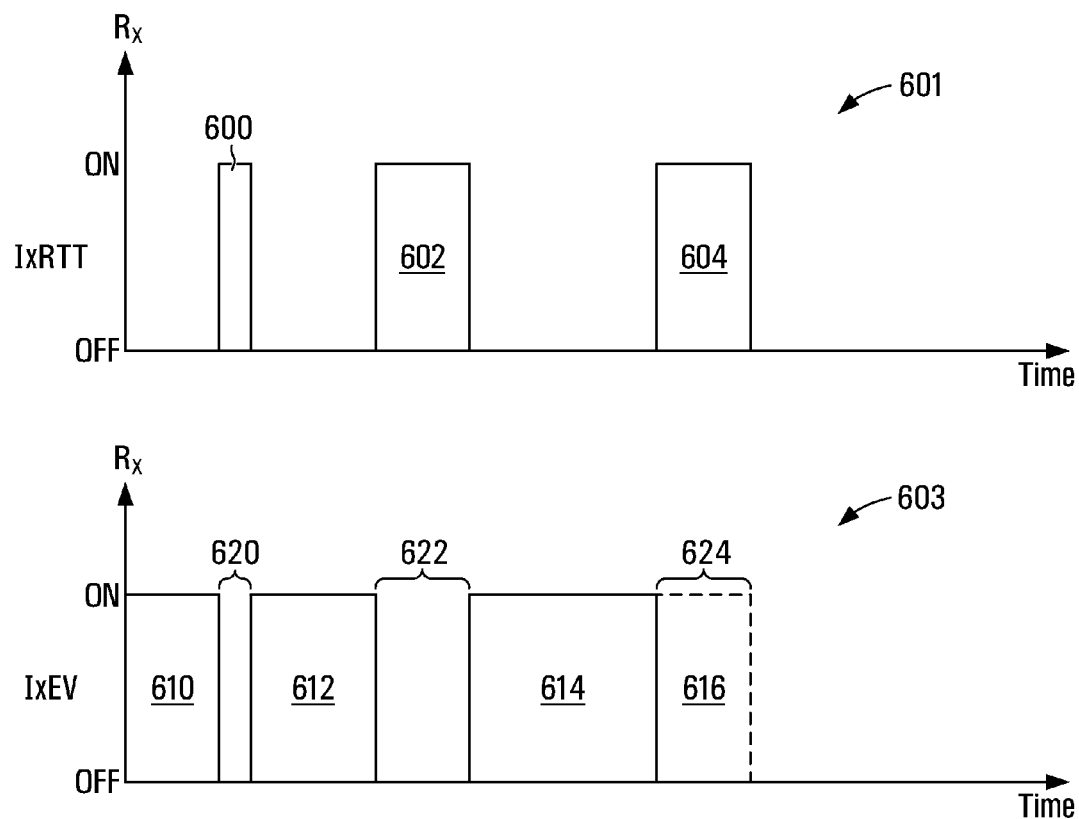
FIG. 6 is an example timeline depicting how lengthy 1xRTT tune aways may interfere with 1xEV services.

FIG. 6 is an example timeline depicting how lengthy 1xRTT tune aways may interfere with 1xEV services. The top view 601 depicts periods in which a transceiver of a mobile device is tuned to 1xRTT, and the bottom view 603 depicts periods in which the transceiver of the mobile device is tuned to 1xEV. During an initial period 610 and subsequent periods 612 and 614, the transceiver of the mobile device is tuned to 1xEV. During a slot 600 and subsequent longer periods 602 and 604 (corresponding respectively to intervals 620, 622, and 624 along the 1xEV timeline), the transceiver of the mobile device is tuned to 1xRTT. Period 616, depicted with dashed lines, shows a period in which the transceiver might be tuned to 1xEV in some embodiments.

In the example 1xRTT tune away of FIG. 6, during period 610, a mobile device has its transceiver tuned to 1xEV and is transferring data. During slot 600, the mobile device tunes to 1xRTT as part of the slot cycle. Next, the mobile device tunes back to 1xEV during period 612 and continues transferring data. At the beginning of period 602, the mobile device again tunes to 1xRTT according to the slot cycle. In this example, channel conditions are not good at the beginning of period 602, and therefore the tune away during period 602 takes longer than the tune away at slot 600. The mobile device then tunes back to 1xEV during period 614. At the beginning of period 604, the mobile device tunes to 1xRTT as part of the broadcast cycle. In the example, channel conditions remain poor and therefore the tune away during period 604 takes an extended period of time. As a result of this tune away sequence, 1xEV data transfer is interrupted during intervals 620, 622, and 624. To improve data transfer speeds and reduce delays, it is contemplated to avoid at least one tune away from the set 600, 602, and 604. For example, if no tune away was performed during period 604, 1xEV traffic could be transferred uninterrupted during the combined period 614 and 616.

If a mobile device with a single transceiver chose to prevent all tune aways to 1xRTT while a delay sensitive data application is activated, this would potentially cause the user to miss CMAS alerts as well as incoming voice call notifications and incoming SMS notifications while the mobile device is prevented from tuning away to 1xRTT. Also, suppressing the ability to receive CMAS alerts for an indefinite period may be contrary to the FCC mandate. In addition, although a mobile device can skip tuning away to 1xRTT for a period of time, while doing so the mobile device will miss receiving network status changes.

Selective Throttling of 1xRTT Tune Away

According to some embodiments, a mobile device may selectively throttle 1xRTT tune away. Performing the tuning away while handling traffic of the defined type over the first network less frequently than the checking the second network while not handling traffic of the defined type over the first network may consist of selectively throttling tune aways to the second network so that at least some scheduled tune aways are not performed. Selectively throttling tune aways may reduce disruption to traffic of the defined type over the first network. In the case of throttling tune aways intended to check for CMAS messages, the selective throttling is an attempt to balance CMAS performance with faster handling of traffic of the defined type over the first network. If 1xRTT tune away is intelligently throttled while delay sensitive applications are active, a mobile device may receive CMAS messages while lessening disruptions to delay sensitive applications.

In some embodiments, while not handling traffic of the defined type over the first network, tune away is performed according to a slot cycle and/or a broadcast cycle. Then, in some embodiments, while handling traffic of the defined type over the first network, tune aways that would be performed due to the slot cycle are suspended while at least a subset of tune aways according to the broadcast cycle continue to be performed according to selective throttling as disclosed herein. In other embodiments, while handling traffic of the defined type over the first network, at least a subset of tune aways according to the slot cycle and the broadcast cycle continue to be performed according to selective throttling as disclosed herein.

In some embodiments, while handling traffic of the defined type over the first network, the from time to time tuning away to the second network to see if there are any messages comprises tuning away to the second network to see if there are any messages while handling traffic of the defined type if a defined interval has elapsed without tuning away to the second network to see if there are any messages. Doing this ensures that the mobile device cannot throttle tune aways for too long. To determine whether a defined interval has elapsed without tuning away to the second network to see if there are any messages, in some embodiments the mobile device may maintain a timer of the elapsed time since the previous tune away to the second network to see if there are any messages, and the mobile device may compare this timer with a defined maximum duration between tune aways. In other embodiments, the mobile device may maintain a counter of the number of scheduled tune aways that have not been performed since the previous tune away to the second network to see if there are any messages, and the mobile device may compare this counter with a defined maximum permissible number of throttled tune aways.

One example defined maximum duration between tune aways is 20 seconds. Other defined maximum durations may be longer. In some embodiments, the defined maximum duration between tune aways may be selected as a multiple of the broadcast cycle time. For example, if the standard broadcast cycle for CMAS alerts is 20 seconds, a 60 second maximum duration between tune aways may be used.

Figure 7:
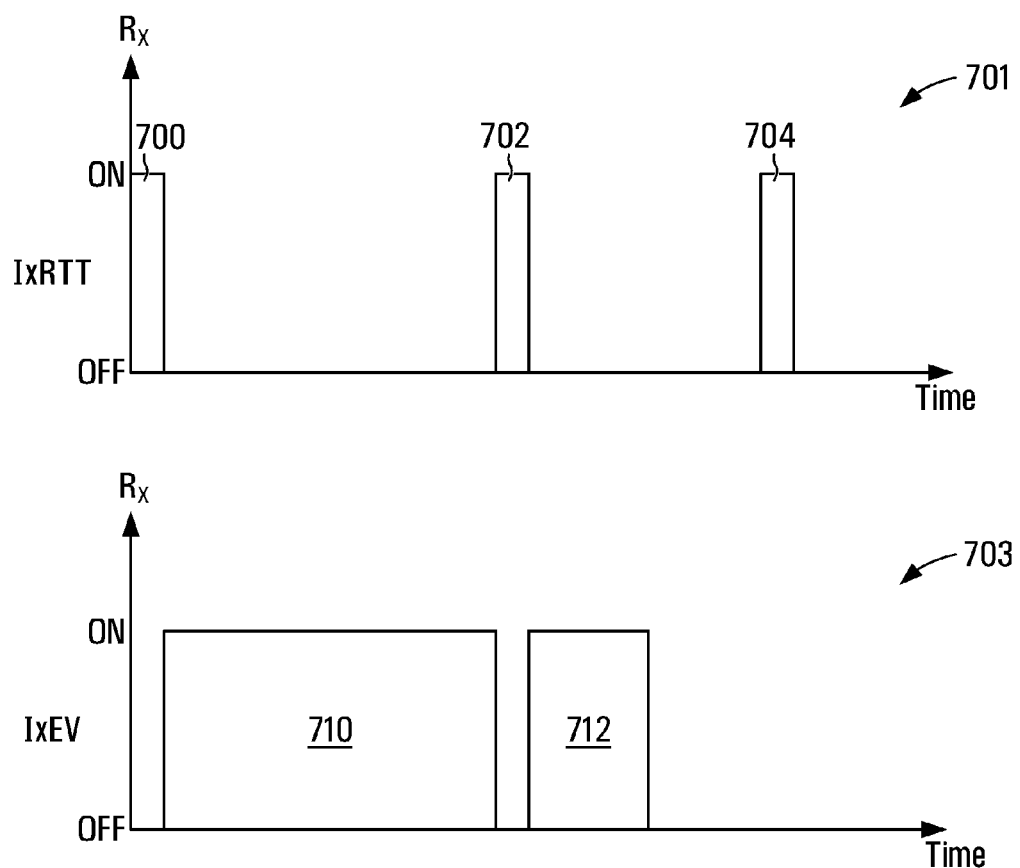
FIG. 7 is an example timeline depicting 1xRTT tune away once a defined interval has elapsed.

FIG. 7 is an example timeline depicting 1xRTT tune away once a defined interval has elapsed. The top view 701 depicts periods in which a transceiver of a mobile device is tuned to 1xRTT, and the bottom view 703 depicts periods in which the transceiver of the mobile device is tuned to 1xEV. During initial slot 700 and subsequent slots 702 and 704, the transceiver of the mobile device is tuned to 1xRTT. During a lengthy period 710 beginning after slot 700, the transceiver is tuned to 1xEV. The transceiver is also tuned to 1xEV during a period 712 beginning after slot 702.

In the example 1xRTT tune away of FIG. 7, a mobile device tunes its transceiver to 1xRTT during slot 700 and then starts a timer that, in this example, will force tune away to 1xRTT if no tune away has been performed in 20 seconds. During period 710, data from a VoIP call is transferred on the 1xEV network. Because VoIP traffic is delay sensitive, during period 710, the mobile device will throttle regular tune aways to 1xRTT. After 20 seconds of VoIP traffic, the timer expires and the mobile device performs the next scheduled tune away to 1xRTT at slot 702. The mobile device then tunes back to 1xEV and resumes the VoIP call during period 712. Once the VoIP call ends, the mobile device resumes its regular slot cycle with a tune away to 1xRTT at slot 704.

In other embodiments, while handling traffic of the defined type over the first network, the from time to time tuning away to the second network to see if there are any messages comprises estimating a duration of a contemplated tune away; and, based on at least the estimated duration, determining whether or not to tune away to the second network. By estimating the duration of a contemplated tune away, the mobile device may determine whether the duration of a contemplated tune away will be too long for an ongoing delay sensitive application.

Estimating a duration of a contemplated tune away may involve first determining whether tuning away to the second network to see if there are any messages is necessary. If the most recently received ESPM indicates that there is no imminent broadcast SMS being sent on the current cell (i.e. the broadcast index is set to 0), a mobile device may throttle all 1xRTT tune away. (From an implementation perspective, some embodiments may be implemented by toggling the High Priority Traffic flag of a transceiver based on the broadcast index of the ESPM.) If the most recently received ESPM indicates that there may be broadcast SMS being sent, the mobile device may then proceed with the tune away duration estimate.

Determining whether or not to tune away to the second network may also be based on a function of how many instances the mobile device has determined not to tune away to the second network or whether a defined interval has elapsed without tuning away to the second network to see if there are any messages, or a combination of the two. In some embodiments, the function of how many instances the mobile device has determined not to tune away to the second network may be computed based on a counter maintained by the mobile device of the number of scheduled tune aways that have not been performed since the previous tune away to the second network to see if there are any messages. To determine whether a defined interval has elapsed without tuning away to the second network to see if there are any messages, in some embodiments the mobile device may maintain a timer of the elapsed time since the previous tune away to the second network to see if there are any messages, and the mobile device may compare this timer with a defined maximum duration between tune aways.

By determining whether or not to tune away to the second network based on a function of how many instances the mobile device has determined not to tune away to the second network or whether a defined interval has elapsed without tuning away to the second network to see if there are any messages, or a combination of the two, a mobile device may avoid throttling 1xRTT wakeup for too long. In particular, because the ESPM may have changed since a delay sensitive application was launched, it is contemplated to have a mechanism to tune to 1xRTT to get an updated ESPM over the air, in order to see if there is any new imminent CMAS alert being broadcast.

In some embodiments, estimating a duration of a contemplated tune away may be performed as a function of at least one of: a signal strength of a current pilot and a signal strength of a candidate pilot. When a mobile device finishes monitoring a 1xRTT slot, the device may measure the signal strength of a current active pilot and several candidate pilots. If the candidate pilots have higher signal strength than the active pilot by a large delta, it may be a good idea to prevent tuning to 1xRTT for at least one 1xRTT slot because the probability of an idle handoff is high. Furthermore, if the signal strengths of active and candidate pilots are very weak, it may also be a good idea to throttle the next 1xRTT tune away so as to prevent the mobile device losing the 1xRTT system and having to perform a 1xRTT system lost scan.

In some embodiments, estimating a duration of a contemplated tune away may be performed as a function of a field of a received ESPM. In other embodiments, estimating a duration of a contemplated tune away may be performed as a function of at least one of: proximity of the mobile device to a zone registration boundary, configurations of neighboring cells, a likelihood of a distance-based registration, a likelihood of a parameter-change registration, a likelihood of selecting a new user zone, and whether a time-based registration on the second network is about to expire.

For example, mobile device re-registers on 1xRTT may be a source of disruption for delay sensitive data applications since re-registration involves tuning a mobile device's transmitter to 1xRTT channels. A mobile device can perform an estimate whether the next 1xRTT tune away will trigger a re-registration. For example, even when a mobile device remains in a single zone, the mobile device may have to re-register with the network, in some cases every 30 minutes, as time based registration expires. If time based registration is about to expire, it may be appropriate to throttle the next 1xRTT wakeup to prevent delay sensitive applications from being disrupted. Furthermore, a mobile device can find out from its neighbor list if it is surrounded by neighbors with different configurations. If it is, there is a higher chance that zone base registration will be required and therefore it may be advisable to throttle at least one 1xRTT tune away. Similar concepts may be employed to throttle 1xRTT tune away to prevent distance-based registration, parameter-change registration, or user zone registration in order to prevent disruption to delay sensitive data applications.

Figure 8:
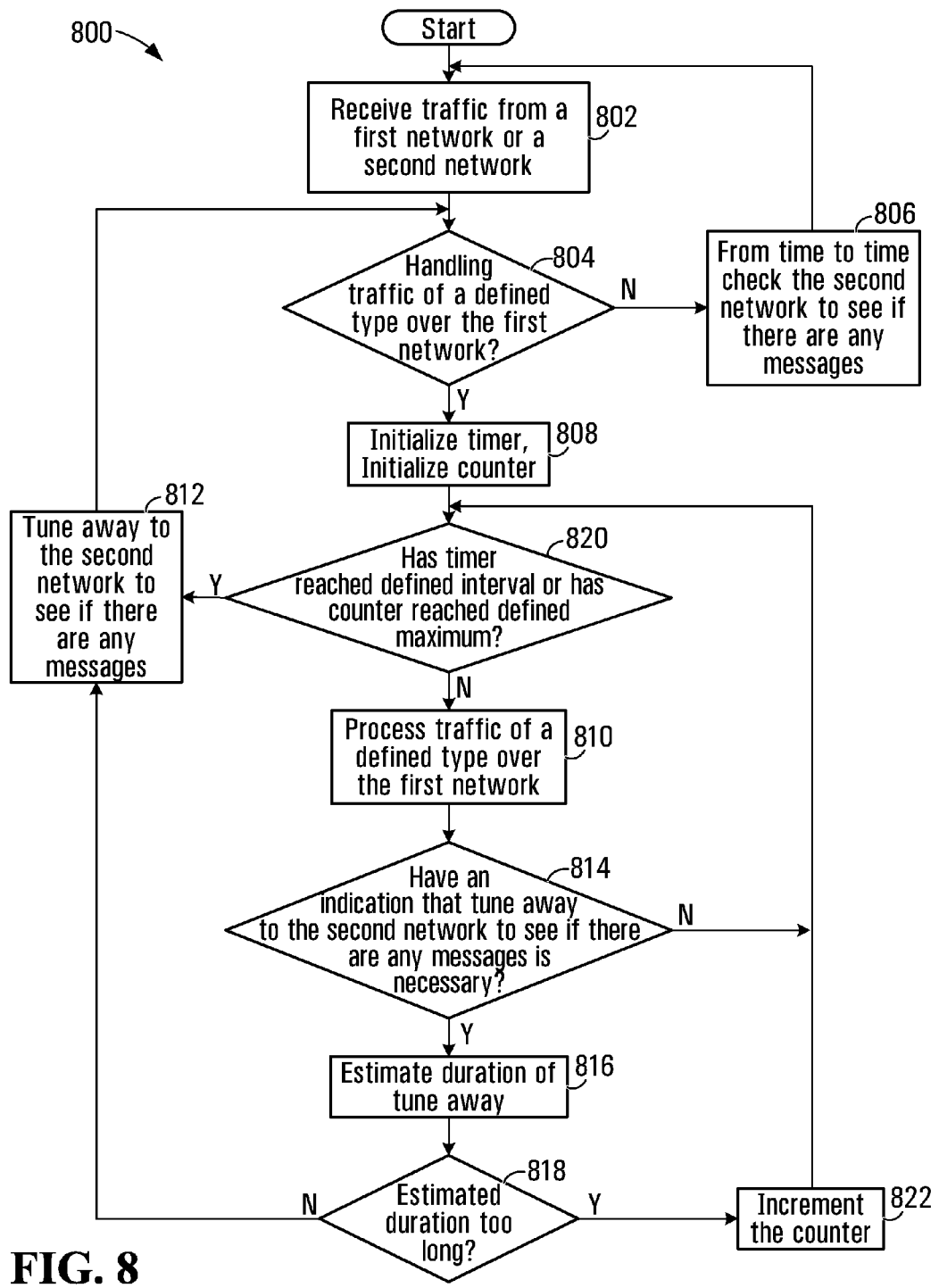
FIG. 8 is a flowchart of another method of tuning away.

FIG. 8 is a flowchart of a method 800 according to an embodiment of the present disclosure that employs a timer and a counter as described above, as well as the features of determining whether tuning away to the second network is necessary and estimating a duration of a contemplated tune away as described above. A mobile device operating some of the time on a first network and some of the time on a second network receives traffic while tuned to either the first or second network at block 802. Next, the mobile device determines at block 804 whether it is handling traffic of a defined type, such as delay sensitive traffic, over the first network. If not, while handling the traffic, at block 806 the mobile device proceeds to check the second network from time to time to see if there are any messages, such as CMAS alerts. If the mobile device is handling traffic of the defined type over the first network, the mobile device initializes a timer and a counter at block 808, then proceeds to block 820. At block 820, the mobile device determines whether the timer has reached a defined elapsed time interval or the counter has reached a defined maximum permissible number. If yes (to either criterion), the mobile device proceeds to block 812, tuning away to the second network to see if there are any messages, then continues at block 804. If no, the mobile device proceeds to process the traffic of the defined type over the first network at block 810. Next, at block 814, the mobile device may determine whether it has received any indication, such as a nonzero broadcast index received via an ESPM, that a tune away to the second network to check to see if there are any messages is necessary. If not, processing the traffic continues at block 820. If yes, the mobile device estimates a duration of a tune away to the second network at block 816. Next, at block 818, the mobile device determines whether the estimated duration would be too long to avoid causing unacceptable disruption to the traffic of a defined type being processed. If not, the mobile device proceeds to block 812, tuning away to the second network to see if there are any messages, then continues at block 804. If the estimated duration would be too long, the mobile device proceeds to block 822, incrementing the counter, then throttles the contemplated tune away and continues at block 820.

In mobile devices incorporating two or more transceivers, tune aways generally do not cause disruption to data traffic, because the primary antenna may remain tuned to the 1xEV network. However, in some mobile devices the secondary antenna(s) and/or secondary transceiver(s) may be weaker than their primary counterparts. In weaker coverage areas, a mobile device of this type may behave as if it has a single transceiver. In such cases, aspects of the present disclosure may be employed to reduce traffic disruption due to tune away.

Figure 9:
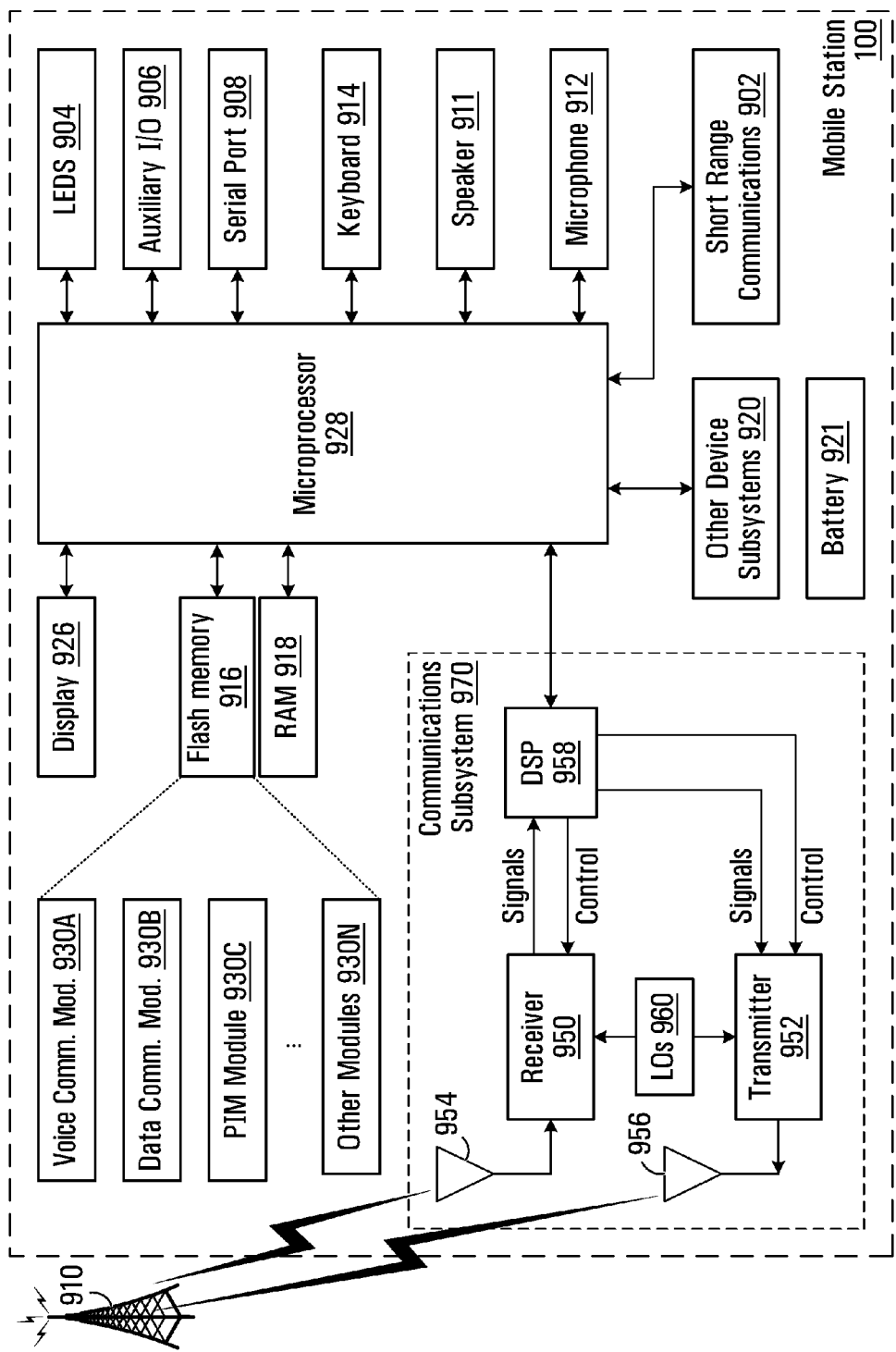
FIG. 9 is a schematic block diagram of another mobile device.

Referring now to FIG. 9, shown is a block diagram of another mobile device 900 that may implement any of the methods described in this disclosure. It is to be understood that mobile device 900 is shown with very specific details for example purposes only. In some embodiments, the wireless mobile device 900 may include specific components for implementing features similar to those of the traffic handling functionality 202, 204 of FIG. 2. In a specific example, the features are implemented in a microprocessor such as microprocessor 928. In another specific example, the features are implemented in a communications subsystem such as communications subsystem 970. In yet another specific example, the features are at least partially implemented in voice communication module 930A and data communication module 930B.

A processing device (a microprocessor 928) is shown schematically as coupled between a keyboard 914 and a display 926. The microprocessor 928 controls operation of the display 926, as well as overall operation of the wireless device 900, in response to actuation of keys on the keyboard 914 by a user.

The wireless device 900 has a housing that may be elongated vertically, or may take on other sizes and shapes (including clamshell housing structures). The keyboard 914 may include a mode selection key, or other hardware or software for switching between text entry and telephony entry.

In addition to the microprocessor 928, other parts of the wireless device 900 are shown schematically. These include: a communications subsystem 970; a short-range communications subsystem 902; the keyboard 914 and the display 926, along with other input/output devices including a set of LEDs 904, a set of auxiliary I/O devices 906, a serial port 908, a speaker 911 and a microphone 912; as well as memory devices including a flash memory 916 and a Random Access Memory (RAM) 918; and various other device subsystems 920. The wireless device 900 may have a battery 921 to power the active elements of the wireless device 900. The wireless device 900 is in some embodiments a two-way radio frequency (RF) communication device having voice and data communication capabilities. In addition, the wireless device 900 in some embodiments has the capability to communicate with other computer systems via the Internet.

Operating system software executed by the microprocessor 928 is in some embodiments stored in a persistent store, such as the flash memory 916, but may be stored in other types of memory devices, such as a read only memory (ROM) or similar storage element. In addition, system software, specific device applications, or parts thereof, may be temporarily loaded into a volatile store, such as the RAM 918. Communication signals received by the wireless device 900 may also be stored to the RAM 918.

The microprocessor 928, in addition to its operating system functions, enables execution of software applications on the wireless device 900. A predetermined set of software applications that control basic device operations, such as a voice communications module 930A and a data communications module 930B, may be installed on the wireless device 900 during manufacture. In addition, a personal information manager (PIM) application module 930C may also be installed on the wireless device 900 during manufacture. The PIM application is in some embodiments capable of organizing and managing data items, such as e-mail, calendar events, voice mails, appointments, and task items. The PIM application is also in some embodiments capable of sending and receiving data items via a wireless network 910. In some embodiments, the data items managed by the PIM application are seamlessly integrated, synchronized and updated via the wireless network 910 with the device user's corresponding data items stored or associated with a host computer system. As well, additional software modules, illustrated as another software module 930N, may be installed during manufacture.

Communication functions, including data and voice communications, are performed through the communication subsystem 970, and possibly through the short-range communications subsystem 902. The communication subsystem 970 includes a receiver 950, a transmitter 952 and one or more antennas, illustrated as a receive antenna 954 and a transmit antenna 956. In addition, the communication subsystem 970 also includes a processing module, such as a digital signal processor (DSP) 958, and local oscillators (LOs) 960. The specific design and implementation of the communication subsystem 970 is dependent upon the communication network in which the wireless device 900 is intended to operate. For example, the communication subsystem 970 of the wireless device 900 may be designed to operate with the Mobitex™, DataTAC™, General Packet Radio Service (GPRS), Enhanced Data Rates for GSM Evolution (EDGE), Evolution Data Optimized (EVDO), or Long Term Evolution (LTE) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. The communication subsystem 970 may also be designed to operate with an 802.11 Wi-Fi network, and/or an 802.16 WiMAX network. Other types of data and voice networks, both separate and integrated, may also be utilized with the wireless device 100.

Network access may vary depending upon the type of communication system. For example, in the Mobitex™ and DataTAC™ networks, wireless devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the wireless device 900 may send and receive communication signals over the communication network 910. Signals received from the communication network 910 by the receive antenna 954 are routed to the receiver 950, which provides for signal amplification, frequency down conversion, filtering, channel selection, etc., and may also provide analog to digital conversion. Analog-to-digital conversion of the received signal allows the DSP 958 to perform more complex communication functions, such as demodulation and decoding. In a similar manner, signals to be transmitted to the network 910 are processed (e.g., modulated and encoded) by the DSP 958 and are then provided to the transmitter 952 for digital to analog conversion, frequency up conversion, filtering, amplification and transmission to the communication network 910 (or networks) via the transmit antenna 956.

In addition to processing communication signals, the DSP 958 provides for control of the receiver 950 and the transmitter 952. For example, gains applied to communication signals in the receiver 950 and the transmitter 952 may be adaptively controlled through automatic gain control algorithms implemented in the DSP 958.

In a data communication mode, a received signal, such as a text message or web page download, is processed by the communication subsystem 970 and is input to the microprocessor 928. The received signal is then further processed by the microprocessor 928 for an output to the display 926, or alternatively to some other auxiliary I/O devices 906. A device user may also compose data items, such as e-mail messages, using the keyboard 914 and/or some other auxiliary I/O device 906, such as a touchpad, a rocker switch, a thumb-wheel, or some other type of input device. The composed data items may then be transmitted over the communication network 910 via the communication subsystem 970.

In a voice communication mode, overall operation of the device is substantially similar to the data communication mode, except that received signals are output to a speaker 911, and signals for transmission are generated by a microphone 912. Alternative voice or audio I/O subsystems, such as a voice message recording subsystem, may also be implemented on the wireless device 900. In addition, the display 926 may also be utilized in voice communication mode, for example, to display the identity of a calling party, the duration of a voice call, or other voice call related information.

The short-range communications subsystem 902 enables communication between the wireless device 900 and other proximate systems or devices, which need not necessarily be similar devices. For example, the short range communications subsystem may include an infrared device and associated circuits and components, or a Bluetooth™ communication module to provide for communication with similarly-enabled systems and devices.

The previous description of some embodiments is provided to enable any person skilled in the art to make or use a device or method according to the present disclosure. Various modifications to these embodiments will be readily apparent to those skilled in the art, and the generic principles of the methods and devices described herein may be applied to other embodiments. Thus, the present disclosure is not intended to be limited to the embodiments shown herein but is to be accorded the widest scope consistent with the principles and novel features disclosed herein.

What is claimed is:

1. A method in a mobile device, the method comprising:
    while not handling traffic of a defined type over a first network, from time to time checking a second network to see if there are any messages;
    while handling traffic of the defined type over the first network, from time to time tuning away to the second network to see if there are any messages, the tuning away while handling traffic of the defined type over the first network taking place less frequently than the checking the second network while not handling traffic of the defined type over the first network,
    upon transitioning from not handling traffic of the defined type over the first network to handling traffic of the defined type over the first network, changing tune away behavior such that tuning away occurs less frequently than prior to making the transition.

2. The method of claim 1, wherein the defined type comprises delay sensitive traffic.

3. The method of claim 1, wherein the tuning away to the second network to see if there are any messages while handling traffic of the defined type over the first network comprises seeing if there are any Commercial Mobile Alert System (CMAS) messages.

4. The method of claim 1, wherein while handling traffic of the defined type over the first network, from time to time tuning away to the second network to see if there are any messages comprises:
    tuning away to the second network to see if there are any messages while handling traffic of the defined type if a defined interval has elapsed without tuning away to the second network to see if there are any messages.

5. The method of claim 1, further comprising, while handling traffic of the defined type over the first network:
    estimating a duration of a contemplated tune away;
    based on at least a result of estimating the duration, determining whether or not to tune away to the second network.

6. The method of claim 5, wherein estimating a duration of a contemplated tune away comprises first determining whether tuning away to the second network to see if there are any messages is necessary.

7. The method of claim 5, wherein said determining whether or not to tune away to the second network is also made as a function of how many instances the mobile device had determined not to tune away to the second network or whether a defined interval has elapsed without tuning away to the second network to see if there are any messages.

8. The method of claim 5, wherein estimating a duration of a contemplated tune away is performed as a function of at least one of: a signal strength of a current pilot and a signal strength of a candidate pilot.

9. The method of claim 5, wherein estimating a duration of a contemplated tune away is performed as a function of a field of a received Extended System Parameter Message (ESPM).

10. The method of claim 5, wherein estimating a duration of a contemplated tune away is performed as a function of at least one of: proximity of the mobile device to a zone registration boundary, configurations of neighboring cells, a likelihood of a distance-based registration, a likelihood of a parameter-change registration, a likelihood of selecting a new user zone, and whether a time-based registration on the second network is about to expire.

11. The method of claim 1, wherein operating on the first network comprises obtaining data services, and operating on the second network comprises obtaining voice services.

12. The method of claim 1, wherein the first network is a 1xEV-DO network and the second network is a 1xRTT network.

13. A mobile device comprising:
    at least one antenna;
    a transceiver using the at least one antenna;
    a controller configured to control the transceiver to:
        while not handling traffic of a defined type over a first network, from time to time check a second network to see if there are any messages;
        while handling traffic of the defined type over the first network, from time to time tune away to the second network to see if there are any messages, the tuning away while handling traffic of the defined type over the first network taking place less frequently than the checking the second network while not handling traffic of the defined type over the first network, upon transitioning from not handling traffic of the defined type over the first network to handling traffic of the defined type over the first network, change tune away behavior such that tuning away occurs less frequently than prior to making the transition.

14. The mobile device of claim 13, wherein the defined type comprises delay sensitive traffic.

15. The mobile device of claim 13, wherein the traffic module is configured so that the tune away to the second network to see if there are any messages while handling traffic of the defined type over the first network sees if there are any Commercial Mobile Alert System (CMAS) messages.

16. The mobile device of claim 13, wherein the traffic module is configured so that the from time to time tune away to the second network to see if there are any messages, while handling traffic of the defined type over the first network, comprises:

tuning away to the second network to see if there are any messages while handling traffic of the defined type if a defined interval has elapsed without tuning away to the second network to see if there are any messages.

17. The mobile device of claim 13, wherein the traffic module is further configured to, while handling traffic of the defined type over the first network:

estimate a duration of a contemplated tune away;

based on at least a result of estimating the duration, determine whether or not to tune away to the second network.

18. The mobile device of claim 17, wherein the traffic module is further configured to, when estimating the duration of a contemplated tune away, first determine whether tuning away to the second network to see if there are any messages is necessary.

19. The mobile device of claim 17, wherein the determination whether or not to tune away to the second network is also made as a function of how many instances the mobile device had determined not to tune away to the second network or whether a defined interval has elapsed without tuning away to the second network to see if there are any messages.

20. The mobile device of claim 17, wherein the estimate of a duration of a contemplated tune away is a function of at least one of: a signal strength of a current pilot and a signal strength of a candidate pilot.

21. (Original The mobile device of claim 17, wherein the estimate of a duration of a contemplated tune away is a function of a field of a received Extended System Parameter Message (ESPM).

22. The mobile device of claim 17, wherein the estimate of a duration of a contemplated tune away is a function of at least one of: proximity of the mobile device to a zone registration boundary, configurations of neighboring cells, a likelihood of a distance-based registration, a likelihood of a parameter-change registration, a likelihood of selecting a new user zone and whether a time-based registration on the second network is about to expire.

23. The mobile device of claim 13, wherein the transceiver's operation on the first network comprises obtaining data services, and the transceiver's operation on the second network comprises obtaining voice services.

24. The mobile device of claim 13, wherein the first network is a 1xEV-DO network and the second network is a 1xRTT network.

25. A tangible computer readable medium having recorded thereon instructions for execution by a mobile device, said instructions when executed causing the mobile device to execute a method comprising:

while not handling traffic of a defined type over a first network, from time to time checking a second network to see if there are any messages;

while handling traffic of the defined type over the first network, from time to time tuning away to the second network to see if there are any messages, the tuning away while handling traffic of the defined type over the first network taking place less frequently than the checking the second network while not handling traffic of the defined type over the first network, upon transitioning from not handling traffic of the defined type over the first network to handling traffic of the defined type over the first network, changing tune away behavior such that tuning away occurs less frequently than prior to making the transition.

26. The method of claim 1, wherein the tuning away while handling traffic of the defined type over the first network comprises selectively throttling tune aways to the second network so that at least some scheduled tune aways are not performed and other scheduled tune aways are performed.

27. The mobile device of claim 13, wherein the tuning away while handling traffic of the defined type over the first network comprises selectively throttling tune aways to the second network so that at least some scheduled tune aways are not performed and other scheduled tune aways are performed.

28. The tangible computer readable medium of claim 25, wherein the tuning away while handling traffic of the defined type over the first network comprises selectively throttling tune aways to the second network so that at least some scheduled tune aways are not performed and other scheduled tune aways are performed.

* * * * *